(12) United States Patent
Tsuge et al.

(10) Patent No.: US 10,770,739 B2
(45) Date of Patent: *Sep. 8, 2020

(54) METHOD OF INSPECTING OUTPUT OF FUEL CELL

(71) Applicant: HONDA MOTOR CO., LTD., Minato-ku, Tokyo (JP)

(72) Inventors: Hodaka Tsuge, Tochigi-ken (JP); Takashi Kato, Tochigi-ken (JP); Tadaaki Yamada, Tochigi-ken (JP); Ayumi Mizuno, Tochigi-ken (JP); You Shimomura, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,771

(22) Filed: Sep. 25, 2018

(65) Prior Publication Data

US 2019/0103620 A1   Apr. 4, 2019

(30) Foreign Application Priority Data

Sep. 29, 2017   (JP) ................................. 2017-192067

(51) Int. Cl.
*H01M 8/04*       (2016.01)
*H01M 8/04537*   (2016.01)
*H01M 4/04*       (2006.01)
*H01M 8/04858*   (2016.01)
*H01M 8/1004*     (2016.01)
(Continued)

(52) U.S. Cl.
CPC ..... *H01M 8/04619* (2013.01); *H01M 4/0442* (2013.01); *H01M 4/926* (2013.01); *H01M 8/04* (2013.01); *H01M 8/0488* (2013.01); *H01M 8/0491* (2013.01); *H01M 8/04753* (2013.01); *H01M 8/1004* (2013.01)

(58) Field of Classification Search
CPC combination set(s) only.
See application file for complete search history.

(56) References Cited

U.S. PATENT DOCUMENTS

2009/0061276 A1* 3/2009 Tamura ............... H01M 4/8605
429/502
2010/0183945 A1* 7/2010 Kurungot ............ H01M 4/8652
429/485

(Continued)

FOREIGN PATENT DOCUMENTS

JP   2011-028965   2/2011

OTHER PUBLICATIONS

Decision to Grant Patent (Year: 2019).*

*Primary Examiner* — Alexander Usyatinsky
(74) *Attorney, Agent, or Firm* — Amin, Turocy & Watson, LLP

(57) ABSTRACT

In a method of inspecting an output of a fuel cell, an oxidation step is performed, and thereafter, a measurement step is performed. In the oxidation step, oxidation treatment is applied to an electrode catalyst contained in an anode and a cathode. After the oxidation treatment is applied to the electrode catalyst of the anode and the cathode, in the measurement step, a measurement current which is smaller than a rated current of the fuel cell is applied to the anode and the cathode to measure the output of the fuel cell.

3 Claims, 6 Drawing Sheets

(51) Int. Cl.
*H01M 4/92* (2006.01)
*H01M 8/04746* (2016.01)

(56) References Cited

U.S. PATENT DOCUMENTS

| | | | |
|---|---|---|---|
| 2010/0233554 A1* | 9/2010 | Nogi | H01M 8/04156 |
| | | | 429/428 |
| 2014/0352615 A1* | 12/2014 | Kabasawa | H05H 7/04 |
| | | | 118/712 |
| 2016/0301094 A1* | 10/2016 | Longman | H01M 8/0438 |
| 2019/0103618 A1* | 4/2019 | Tsuge | H01M 8/1004 |
| 2019/0103619 A1* | 4/2019 | Tsuge | H01M 8/04619 |

* cited by examiner

FIG. 2

| NUMBER OF TIMES | EMBODIMENT EXAMPLES | | | COMPARATIVE EXAMPLE 1 (NO OXIDATION STEP) |
|---|---|---|---|---|
| | 1-1 (MAINTAIN TIME: 5 MIN.) | 1-2 (MAINTAIN TIME: 10 MIN.) | 1-3 (MAINTAIN TIME: 20 MIN.) | |
| 1 | 1.0022 | 1.0009 | 1.0018 | 0.9934 |
| 2 | 0.9981 | 0.9985 | 1.0073 | 0.9937 |
| 3 | 1.0043 | 1.0054 | 1.0057 | 0.9866 |
| 4 | 1.0029 | 0.9957 | 0.9975 | 1.0068 |
| 5 | 1.0030 | 0.9938 | 0.9980 | 1.0260 |
| 6 | 1.0032 | 1.0030 | 0.9939 | 0.9977 |
| 7 | 1.0036 | 0.9958 | 0.9971 | 0.9926 |
| 8 | 0.9966 | 1.0035 | 0.9984 | 1.0003 |
| 9 | 0.9916 | 1.0029 | 0.9992 | 0.9964 |
| 10 | 0.9946 | 1.0006 | 1.0013 | 1.0065 |
| STANDARD DEVIATION | 0.004458 | 0.003899 | 0.004079 | 0.011057 |
| AVERAGE | 1.00001 | 1.00001 | 1.00002 | 1.00000 |

FIG. 4

| NUMBER OF TIMES | EMBODIMENT EXAMPLES | | | COMPARATIVE EXAMPLE 2 (NO OXIDATION STEP) |
|---|---|---|---|---|
| | 2-1 (MAINTAIN TIME: 5 MIN.) | 2-2 (MAINTAIN TIME: 10 MIN.) | 2-3 (MAINTAIN TIME: 20 MIN.) | |
| 1 | 1.0010 | 1.0046 | 1.0007 | 0.9963 |
| 2 | 0.9957 | 1.0056 | 1.0043 | 1.0048 |
| 3 | 0.9946 | 1.0010 | 1.0017 | 0.9865 |
| 4 | 0.9987 | 0.9970 | 1.0029 | 0.9989 |
| 5 | 1.0026 | 0.9946 | 0.9983 | 1.0114 |
| 6 | 0.9972 | 1.0010 | 0.9999 | 0.9941 |
| 7 | 1.0051 | 0.9985 | 1.0007 | 1.0016 |
| 8 | 1.0045 | 0.9973 | 1.0027 | 1.0022 |
| 9 | 0.9983 | 1.0018 | 0.9942 | 1.0054 |
| 10 | 1.0023 | 0.9985 | 0.9946 | 0.9988 |
| STANDARD DEVIATION | 0.003642 | 0.003459 | 0.003395 | 0.006855 |
| AVERAGE | 1.00000 | 0.99999 | 1.00000 | 1.00000 |

FIG. 6

| NUMBER OF TIMES | EMBODIMENT EXAMPLE 1-1 (OXIDATION STEP + MEASUREMENT STEP) | EMBODIMENT EXAMPLE 3 (REDUCTION STEP + OXIDATION STEP + MEASUREMENT STEP) |
|---|---|---|
| 1 | 1.0022 | 1.0021 |
| 2 | 0.9981 | 0.9998 |
| 3 | 1.0043 | 0.9995 |
| 4 | 1.0029 | 0.9992 |
| 5 | 1.0030 | 0.9971 |
| 6 | 1.0032 | 1.0013 |
| 7 | 1.0036 | 0.9971 |
| 8 | 0.9966 | 1.0025 |
| 9 | 0.9916 | 1.0003 |
| 10 | 0.9946 | 1.0011 |
| STANDARD DEVIATION | 0.004458 | 0.001868 |
| AVERAGE | 1.00001 | 1.00000 |

METHOD OF INSPECTING OUTPUT OF FUEL CELL

CROSS-REFERENCE TO RELATED APPLICATION

This application is based upon and claims the benefit of priority from Japanese Patent Application No. 2017-192067 filed on Sep. 29, 2017, the contents of which are incorporated herein by reference.

BACKGROUND OF THE INVENTION

Field of the Invention

The present invention relates to a method of inspecting an output of a fuel cell. The fuel cell includes an electrolyte membrane of solid polymer, an anode provided on one surface of the electrolyte membrane, and a cathode provided on the other surface of the electrolyte membrane.

Description of the Related Art

Fuel cells having an anode on one surface of an electrolyte membrane of solid polymer, and a cathode on the other surface of the electrolyte membrane are known. As a method of inspecting an output of a fuel cell of this type, for example, Japanese Laid-Open Patent Publication No. 2011-028965 proposes to apply a current equivalent to the rated current in actual power generation to the anode and cathode, and determine the presence/absence of abnormality based on whether the obtained output is not less than a reference value.

SUMMARY OF THE INVENTION

In the above output inspection method, an apparatus in large scale or large quantities of the fuel gas and oxygen-containing gas are required for applying large current equivalent to the rated current between the electrodes. Therefore, increased costs are required for the output inspection.

However, if a current smaller than the rated current is simply applied between the electrodes in the output inspection in order to reduce the costs, variation tends to occur in the results of the output inspection and the accuracy of the output inspection may be reduced.

A main object of the present invention is to provide a method of inspecting an output of a fuel cell in which it is possible to measure the output of the fuel cell at low cost and highly accurately.

In the case where a small current is applied between the electrodes at the time of output inspection, the desired accuracy of output inspection may not be achieved. With regard to the cause of this point, as a result of intensive studies of the inventors of the present application, the following findings were obtained. Specifically, if a large current equivalent to the rated current is applied between the electrodes, it is possible to decrease the voltage between the electrodes to be significantly lower than the reduction potential of the electrode catalyst. For this reason, even if variation is present in the oxidation reduction state of the electrode catalyst before measurement of the output of the fuel cell, by applying the large current between the electrodes afterward, so as to measure the output of the fuel cell, it is possible to suppress or eliminate the variation in the oxidation state. As a result, it is possible to suppress variation in measurement results of output of the fuel cell due to the influence of the oxidation reduction state of the electrode catalyst.

On the other hand, if a small current is applied between the electrodes, since the voltage between the electrodes becomes large, in the case where variation is present in the oxidation reduction state of the electrode catalyst before measurement of output of the fuel cell, it follows that output inspection is performed in the presence of the variation in the oxidation reduction state. As a result, variation tends to occur easily in the measurement results of the output of the fuel cell as well, due to the influence of the variation in the oxidation reduction state of the electrode catalyst. Therefore, the desired accuracy of output inspection may not be achieved.

In view of the above, according to an embodiment of the present invention, a method of inspecting an output of a fuel cell is provided. The fuel cell includes an electrolyte membrane of solid polymer, an anode provided on one surface of the electrolyte membrane, and a cathode provided on the other surface of the electrolyte membrane. The method includes an oxidation step of applying oxidation treatment to an electrode catalyst contained in the anode and the cathode, and a measurement step of measuring the output of the fuel cell after the oxidation treatment is applied to the electrode catalyst, by applying a measurement current which is smaller than a rated current of the fuel cell to the anode and the cathode.

In the method of inspecting the output of the fuel cell, the oxidation step is performed before the measurement step to apply oxidation treatment to the electrode catalyst contained in the anode and the cathode. In this manner, it is possible to perform the measurement step after the variation in the oxidation reduction state of the electrode catalyst has been suppressed or eliminated.

In the measurement step, a measurement current which is smaller than the rated current of the fuel cell is applied between the anode and the cathode. Therefore, it is not required to provide an apparatus in large scale or large quantities of the fuel gas, etc. for applying large current equivalent to the rated current. For this reason, with the simple structure, it is possible to perform output inspection of the fuel cell at low cost.

Further, at the time of performing the measurement step, as described above, the variation in the oxidation reduction state of the electrode catalyst has been suppressed or eliminated by the oxidation step. Therefore, in the measurement step, by applying a small current between the anode and the cathode, even in the case where the voltage between the anode and the cathode does not become small enough to suppress or eliminate the variation in the oxidation reduction state of the electrode catalyst, it is possible to suppress variation in the measurement results of the output of the fuel cell. Consequently, it becomes possible to obtain measurement results of the output of the fuel cell highly accurately.

In the method of inspecting the output of the fuel cell, preferably, in the oxidation step, a fuel gas is supplied to the anode and an oxygen-containing gas is supplied to the cathode to cause the voltage between the anode and the cathode to be not less than a reduction potential of the electrode catalyst. In this case, in the oxidation step, it becomes possible to oxidize the electrode catalyst easily and effectively to suppress or eliminate the variation in the oxidation reduction state of the electrode catalyst.

Preferably, the method of inspecting the output of the fuel cell includes a reduction step of applying reduction treatment to the electrode catalyst before the oxidation step. In this manner, by performing the oxidation step after the reduction step, it is possible to perform the measurement step after the variation in the oxidation reduction state of the electrode catalyst has been suppressed or eliminated. Therefore, it becomes possible to perform output inspection of the fuel cell accurately to a greater extent.

In the method of inspecting the output of the fuel cell, preferably, in the reduction step, a fuel gas is supplied to the anode, an inert gas is supplied to the cathode, and a cyclic voltage is applied to the fuel cell, and the cyclic voltage is increased and decreased within a predetermined range having a minimum voltage less than a reduction potential of the electrode catalyst. In this case, in the reduction step, it is possible to easily and effectively reduce the electrode catalyst. Therefore, by performing the oxidation step after the reduction step, it is possible to suppress or eliminate the variation in the oxidation reduction state of the electrode catalyst effectively to a greater extent. Consequently, it becomes possible to achieve further improvement in the accuracy of measuring the output of the fuel cell.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a table showing the ratio values relative to the average value, the standard deviation, and the average value of the ratio values of 10 measurement results of the output in each of embodiment examples 1-1 to 1-3 and a comparative example 1;

FIG. 4 is a table showing the ratio values relative to the average value, the standard deviation, and the average value of the ratio values of 10 measurement results of the output in each of embodiment examples 2-1 to 2-3 and a comparative example 2;

FIG. 6 is a table showing the ratio values relative to the average value, the standard deviation, and the average value of the ratio values of 10 measurement results of the output in each of embodiment examples 1-1 and 3.

DESCRIPTION OF THE PREFERRED EMBODIMENTS

Preferred embodiments of a method of inspecting an output of a fuel cell according to the present invention will be described in detail with reference to the accompanying drawings.

Figure 1:
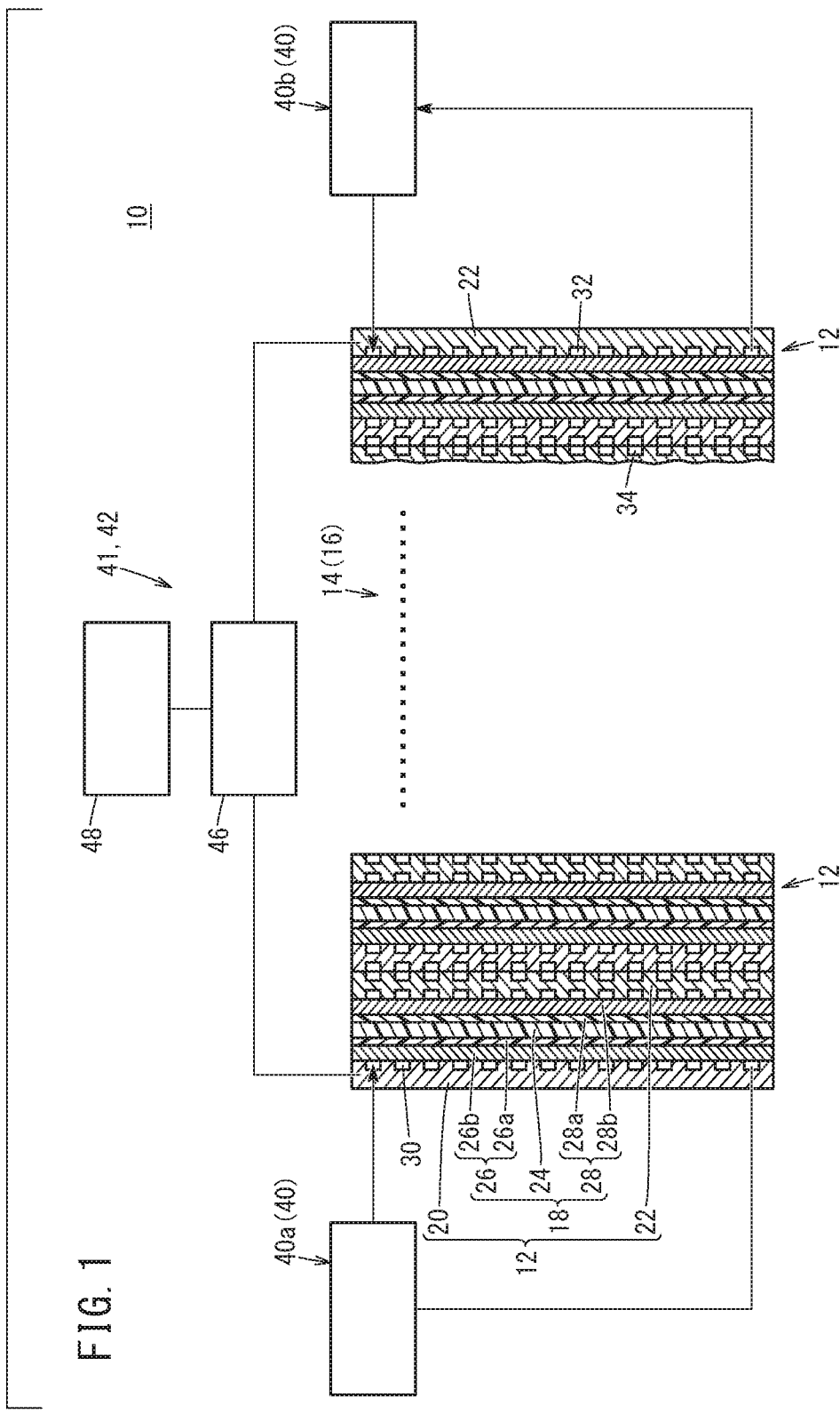
FIG. 1 is a diagram schematically showing a structure of an output inspection apparatus configured to perform a method of inspecting an output of a fuel cell according to an embodiment of the present invention.

A method of inspecting an output of a fuel cell according to an embodiment of the present invention (hereinafter also referred to simply as an "output inspection method") can be performed using an output inspection apparatus 10 shown in FIG. 1. The output inspection apparatus 10 measures the output of a fuel cell 16 in the form of a stack 14 formed by stacking a plurality of power generation cells 12 (unit fuel cells) together. The output inspection apparatus 10 can not only measure the output of the fuel cell 16 in the form of the stack 14, but can also measure an output of a fuel cell (not shown) in the form of a single power generation cell 12.

The power generation cell 12 is formed by sandwiching a membrane electrode assembly (MEA) 18 between a first separator 20 and a second separator 22. For example, the MEA 18 includes an electrolyte membrane 24, an anode 26 provided on one surface of the electrolyte membrane 24, and a cathode 28 provided on the other surface of the electrolyte membrane 24. The electrolyte membrane 24 is a thin membrane of solid polymer such as perfluorosulfonic acid, for example.

The anode 26 is made of porous material including a first electrode catalyst layer 26a facing one surface of the electrolyte membrane 24, and a first gas diffusion layer 26b stacked on the first electrode catalyst layer 26a. The cathode 28 is made of porous material including a second electrode catalyst layer 28a facing the other surface of the electrolyte membrane 24, and a second gas diffusion layer 28b stacked on the second electrode catalyst layer 28a.

Each of the first electrode catalyst layer 26a and the second electrode catalyst layer 28a includes an electrode catalyst supporting a catalyst metal such as platinum, etc. on a catalyst support of carbon such as carbon black, and an ion conductive polymer binder. It should be noted that the electrode catalyst may only comprise catalyst metal such as platinum black, for example, and the electrode catalyst need not necessarily include a catalyst support.

In the case where the electrode catalyst comprises platinum, for example, the following reactions occur on the surface of the electrode catalyst:

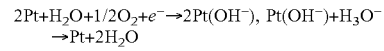

The reduction potential of this electrode catalyst is about 0.75 V.

For example, each of the first gas diffusion layer 26b and the second gas diffusion layer 28b is made of porous material such as carbon paper, carbon cloth, etc. The first gas diffusion layer 26b is placed to face the first separator 20, and the second separator 22 is placed to face the second gas diffusion layer 28b. For example, carbon separators are used as the first separator 20 and the second separator 22. Alternatively, metal separators may be used as the first separator 20 and the second separator 22.

The first separator 20 has a fuel gas flow field 30 on its surface facing the first gas diffusion layer 26b. The fuel gas flow field 30 is connected to a fuel gas supply passage (not shown) for supplying a fuel gas such as a hydrogen-containing gas, and a fuel gas discharge passage (not shown) for discharging the fuel gas.

The second separator 22 has an oxygen-containing gas flow field 32 on its surface facing the second gas diffusion layer 28b. The oxygen-containing gas flow field 32 is connected to an oxygen-containing gas supply passage (not shown) for supplying an oxygen-containing gas, and connected to an oxygen-containing gas discharge passage (not shown) for discharging the oxygen-containing gas.

When a plurality of the power generation cells 12 are stacked together, a coolant flow field 34 is formed between a surface of the first separator 20 and a surface of the second separator 22 which face each other. The coolant flow field 34 is connected to a coolant supply passage (not shown) for supplying a coolant and a coolant discharge passage (not shown) for discharging the coolant.

Next, the output inspection apparatus 10 will be described below. The output inspection apparatus 10 includes a gas supply unit 40, an energizing unit 41, and a voltage application unit 42 as main components. The gas supply unit 40 includes a first supply unit 40a configured to supply an anode gas to the anode 26 through the fuel gas flow field 30, and a second supply unit 40b configured to supply a cathode gas to the cathode 28 through the oxygen-containing gas flow field 32. Examples of the anode gas include the above fuel gas. Examples of the cathode gas include an inert gas such as nitrogen, the above oxygen-containing gas, and a mixed gas of inert gas and oxygen-containing gas.

The first supply unit 40a can regulate the flow rate of the anode gas supplied to the anode 26, and mix water vapor with the anode gas to regulate the dew point of the anode gas. Likewise, the second supply unit 40b can regulate the flow rate of the cathode gas supplied to the cathode 28, and mix water vapor with the cathode gas to regulate the dew point of the cathode gas. The first supply unit 40a and the second supply unit 40b may circulate the anode gas and the cathode gas to/from the stack 14, or confine the anode gas and the cathode gas in the stack 14, or pass the gases through the stack 14.

In the state where the anode gas is supplied to the anode 26 by the first supply unit 40a and the cathode gas is supplied to the cathode 28 by the second supply unit 40b, the energizing unit 41 electrically connects the anode 26 and the cathode 28 for energization between both electrodes (the anode 26 and the cathode 28). In this regard, the energizing unit 41 can regulate the magnitude of the electrical current applied between the anode 26 and the cathode 28.

The voltage application unit 42 applies a cyclic voltage which is increased and decreased within a predetermined range, to the stack 14 through the first separator 20 provided at one end of the stack 14 in the stacking direction and the second separator 22 provided at the other end of the stack 14 in the stacking direction. That is, the voltage application unit 42 can change the applied voltage over time, and repeat the changes over time under control which is similar to that of potential sweep in the cyclic voltammetry scheme.

For example, the energizing unit 41 and the voltage application unit 42 can be made up of a potentiostat/galvanostat (P/G stat) 46 which is capable of implementing current control and potential control between the electrodes, and a sweeper 48, etc. capable of changing the preset current and the preset potential of the P/G stat 46 over time.

Hereinafter, the output inspection method according to the embodiment of the present invention using the output inspection apparatus 10 will be described below. Firstly, after the stack 14 is assembled, the stack 14 is set to the output inspection apparatus 10. Specifically, the energizing unit 41 and the voltage application unit 42 (P/G stat 46) are electrically connected to the stack 14. The first supply unit 40a is connected to the fuel gas flow field 30, and the second supply unit 40b is connected to the oxygen-containing gas flow field 32.

Next, an oxidization step is performed to apply oxidation treatment to the electrode catalyst contained in the anode 26 and the cathode 28. In this oxidation step, the first supply unit 40a supplies a fuel gas as the anode gas to the anode 26, and the second supply unit 40b supplies an oxygen-containing gas as the cathode gas to the cathode 28.

In this regard, preferably, the gas supply unit 40 is operated to allow at least one of the anode gas and the cathode gas to contain water vapor so as to prevent the electrolyte membrane 24 from being dried, for example. In this case, the temperature of the stack 14 and the dew points of the gases are regulated in order to achieve the balance where both of flooding in the stack 14 and drying of the electrolyte membrane 24 are suppressed. Flooding herein means, for example, that the presence of excessive water in the liquid state in the stack 14 obstructs supply of the gases.

As described above, the fuel gas and the oxygen-containing gas are supplied respectively to the anode 26 and the cathode 28 so as to cause a voltage between the anode 26 and the cathode 28 to become not less than the reduction potential of the electrode catalyst. As mentioned above, in the case where the electrode catalyst contains platinum, the reduction potential of the electrode catalyst is about 0.75 V. Therefore, for example, the average cell potential of the cathode 28 is about 1.0 V. By maintaining this state until the electrode catalyst is oxidized, it is possible to apply oxidization treatment to the electrode catalyst. By performing the oxidation step as described above, it is possible to suppress or eliminate variation in the oxidation reduction state of the electrode catalyst.

Next, a measurement step is performed. After oxidation treatment is applied to the electrode catalyst, the measurement step is performed by applying a measurement current to the anode 26 and the cathode 28 to measure the output of the stack 14. The measurement current which is applied as energizing current in the measurement step is smaller than the rated current which is applied as energizing current during actual power generation of the stack 14.

Specifically, in the measurement step, in the state where supply of the fuel gas and the oxygen-containing gas is maintained by the first supply unit 40a and the second supply unit 40b, the anode 26 and the cathode 28 are electrically connected together by the energizing unit 41. That is, in the measurement step, as the energizing unit 41, the P/G stat 46 implements current control between the anode 26 and the cathode 28. In this regard, for example, in the case where the rated current of the stack 14 is 1.00 $A/cm^2$, the energizing unit 41 applies a measurement current of 0.02 $A/cm^2$, which is 1/50 of the rated current, to the cathode 28 and the anode 26.

As described above, in the measurement step, the voltage measured by applying the measurement current which is smaller than the rated current between the anode 26 and the cathode 28 can be obtained as the measurement result of the output of the stack 14. In this manner, it is not required to provide an apparatus in large scale or large quantities of the fuel gas, etc. for applying large current equivalent to the rated current. For this reason, with the simple structure, it becomes possible to perform the output inspection of the stack 14 at low cost.

Further, in the output inspection method, the oxidation step is performed before the measurement step to apply oxidation treatment to the electrode catalyst contained in the anode 26 and the cathode 28. In this manner, it becomes possible to perform the measurement step after variation in the oxidation reduction state of the electrode catalyst has been suppressed or eliminated. Therefore, in the measurement step, using a smaller measurement current applied to the anode 26 and the cathode 28, even in the case where the voltage between the electrodes does not become small enough to suppress or eliminate the variation in the oxidation reduction state of the electrode catalyst, it is possible to suppress variation in the measurement results of the output of the stack 14. Consequently, it becomes possible to perform the output inspection of the stack 14 highly accurately.

As described above, in this output inspection method, it becomes possible to measure the output of the stack 14 at low cost and highly accurately.

Based on the obtained measurement results of the output, in the case of inspecting the quality of the stack 14, for example, the following method can be adopted. Specifically, using the stack of the same model as the stack 14, the relationship between the output obtained when the rated current is applied and the output obtained when the measurement current is applied is determined beforehand. From this relationship, with a reference value of the output at which the stack 14 is judged to be of good quality when the rated current is applied, the corresponding value of the output obtained when the measurement current is applied is determined as a judge value. Then, the measurement result of the stack 14 obtained in the measurement step is compared with the judge value, whereby it is possible to inspect the assembled stack 14 to determine whether the assembled stack 14 has good quality or not.

The present invention is not limited specially to the above described embodiment. Various modifications can be made without deviating from the scope of the present invention.

For example, in the embodiment, in the measurement step, the second supply unit 40b supplies the oxygen-containing gas to the cathode 28. Alternatively, the second supply unit 40b may supply a mixed gas of an oxygen-containing gas and an inert gas to the cathode 28. In this manner, by supplying a mixed gas to the cathode 28, the measurement result of the output of the stack 14 can be suppressed to have a value less than the reduction potential of the electrode catalyst.

In this manner, since it is possible to suppress oxidation of the electrode catalyst at the time of the measurement step, the variation in the oxidation reduction state of the electrode catalyst is suppressed further effectively, and the measurement result of the output can be obtained in this state. Therefore, for example, even in the case where, in the oxidation step, the maintain time for maintaining the voltage between the anode 26 and the cathode 28 to be not less than the reduction potential of the electrode catalyst is short, it becomes possible to measure the output of the stack 14 highly accurately in the measurement step.

Further, since the mixed gas is supplied to the cathode 28, it is possible to reduce the quantity of the hydrogen gas consumed in the power generation reactions. Therefore, it becomes possible to achieve further reduction in the cost required for the output inspection of the stack 14.

Further, the output inspection method of the present embodiment may further include a reduction step of applying reduction treatment to the electrode catalyst before the oxidation step. Specifically, for example, after the stack 14 is assembled, the stack 14 is set to the output inspection apparatus 10. Thereafter, the first supply unit 40a supplies the fuel gas to the anode 26, and the second supply unit 40b supplies an inert gas to the cathode 28. In the procedure, while the gas supply unit 40 supplies the anode gas and the cathode gas, the voltage application unit 42 applies a cyclic voltage to the stack 14. The cyclic voltage is increased and decreased within a predetermined range having a minimum voltage less than the reduction potential of the electrode catalyst.

That is, in the reduction step, the P/G stat 46 as the voltage application unit 42 implements potential control between the anode 26 and the cathode 28. Therefore, in the case where the electrode catalyst contains platinum, the minimum value of the cyclic voltage applied to the stack 14 by the voltage application unit 42 is set to be less than 0.75 V. In this regard, preferably, the voltage application unit 42 applies the voltage in the range between 0.08 V and 1.00 V to the stack 14. By applying a voltage of not less than 0.08 V, it becomes possible to repeatedly induce reactions where hydrogen is adsorbed to, and desorbed from the electrode catalyst. Accordingly, it becomes possible to reduce the surface of the electrode catalyst more effectively. On the other hand, by applying a voltage of not more than 1.00 V, even in the case where the electrode catalyst includes a carbon catalyst support, it becomes possible to avoid degradation of the catalyst support.

Further, when one cycle is formed of a period in which the voltage applied to the stack 14 is increased from the minimum value to the maximum value and thereafter, decreased from the maximum value to the minimum value, this cycle is preferably repeated one or more times, and more preferably, this cycle is repeated two or more times. In this manner, it becomes possible to suitably reduce the electrode catalyst contained in the anode 26 and the cathode 28.

As described above, the oxidation step is performed after the reduction treatment is applied to the electrode catalyst by the reduction step. In this manner, it becomes possible to further effectively suppress or eliminate the variation in the oxidation reduction state of the electrode catalyst. Consequently, in the measurement step after the oxidation step, it becomes possible to obtain the measurement results of the output of the stack 14 with a higher degree of accuracy.

EMBODIMENT EXAMPLES

Embodiment Example 1

A stack 14 was assembled by stacking ten power generation cells 12 each having an MEA 18 with an effective power generation area of 100 cm$^2$, and having an electrode catalyst of platinum. Then, in order to allow the electrode catalyst contained in the anode 26 and the cathode 28 to have variation in the oxidation reduction state, the stack 14 was used for 10 hours, and then, set to the output inspection apparatus 10.

(1) Oxidation Step

The oxidation step was performed for the above stack 14. In the oxidation step, for example, the temperature of the stack 14 was regulated to 80° C. by supplying a heat transmission medium having a regulated temperature to the coolant flow field 34 provided in the stack 14. Further, by the first supply unit 40a, a hydrogen gas (fuel gas) humidified to have a dew point of 75° C. was supplied to the anode 26 at a flow rate of 0.3 NL/min., and by the second supply unit 40b, an air (oxygen-containing gas) humidified to have a dew point of 80° C. was supplied to the cathode 28 at a flow rate of 2.4 NL/min.

Then, after it was confirmed that the average cell potential of the cathode 28 has become substantially constant at around 1.0 V, this state was maintained for a maintain time. An embodiment example of the stack 14 obtained by adopting a maintain time of 5 minutes. will be referred to as embodiment example 1-1. An embodiment example of the stack 14 obtained by adopting a maintain time of 10 minutes. will be referred to as embodiment example 1-2. An embodiment example of the stack 14 obtained by adopting a maintain time of 20 minutes. will be referred to as embodiment example 1-3.

By maintaining the above state, it is possible to maintain the voltage between the anode 26 and the cathode 28 at not less than the reduction potential of the electrode catalyst, and apply oxidation treatment to the electrode catalyst.

(2) Measurement Step

The measurement step was performed for each of the stacks 14 of the embodiment examples 1-1 to 1-3. In the measurement step, the temperature of the stack 14 was regulated to 80° C. Further, by the first supply unit 40*a*, a hydrogen gas humidified to have a dew point of 80° C. was supplied to the anode 26 at a flow rate of 0.3 NL/min., and by the second supply unit 40*b*, an air humidified to have a dew point of 80° C. was supplied to the cathode 28 at a flow rate of 2.4 NL/min. In this manner, power generation reactions were induced at the anode 26 and the cathode 28. Both of the anode 26 and the cathode 28 were electrically connected together by the energizing unit 41. At this time, a measurement current of 0.002 A/cm$^2$ which is smaller than the rated current (1.00 A/cm$^2$) was used as the energizing current. The voltage of each of the stacks 14 of the embodiment examples 1-1 to 1-3 was measured to obtain measurement results of the output.

For each of the stacks 14 of the embodiment examples 1-1 to 1-3, the combination of (1) the oxidation step and (2) the measurement step was repeated 10 times, to obtain 10 measurement results of output. For each of the 10 measurement results of the output, the ratio value relative to the average value was obtained and is shown in FIG. 2. FIG. 2 also shows the standard deviation of the 10 measurement results of output and the average value of the 10 ratio values. It should be noted that the number of times shown in FIG. 2 is the number of times that the combination of the oxidation step and the measurement step was repeated.

Comparative Example 1

In a comparative example 1, only (2) the measurement step was performed without performing (1) the oxidation step. For the stack 14 of the comparative example 1, by repeating (2) the measurement step 10 times, 10 measurement results of output were obtained. In the same manner as in the cases of the embodiment examples 1-1 to 1-3, also in these 10 measurement results of the output, the ratio values relative to the average value, the standard deviation, and the average value of the ratio values were determined, and are shown in FIG. 2 as well. Further, for ease of comparison, the standard deviation determined for each of the embodiment examples 1-1 to 1-3 and the comparative example 1 is shown in a graph of FIG. 3.

It should be noted that, in the measurement step, all of the average values of the measurement results of the outputs of the stacks 14 of the embodiment examples 1-1 to 1-3 and the comparative example 1 where air is supplied to the cathode 28 were not less than the reduction potential of the electrode catalyst (platinum) of 0.75 V.

Embodiment Example 2

In (2) the measurement step, measurement results of the output of embodiment examples 2-1 to 2-3 were obtained in the same manner as in the case of the embodiment examples 1-1 to 1-3 except that the second supply unit 40*b* supplied, as a cathode gas, a mixed gas of air at a flow rate of 0.6 NL/min. and a nitrogen gas at a flow rate of 1.8 NL/min., to the cathode 28.

Comparative Example 2

In (2) the measurement step, the measurement results of the output of a comparative example 2 were obtained in the same manner as in the case of the comparative example 1 except that the second supply unit 40*b* supplied, as the cathode gas, the same mixed gas as in the case of the embodiment example 2 to the cathode 28.

In the same manner as in the cases of the embodiment examples 1-1 to 1-3 and the comparative example 1, also in these measurement results of the output of the embodiment examples 2-1 to 2-3 and the comparative example 2, the ratio values relative to the average value, the standard deviation, and the average value of the ratio values were determined, and are shown in FIG. 4 as well. Further, for ease of comparison, the standard deviation determined for each of the embodiment examples 2-1 to 2-3 and the comparative example 2 is shown in a graph of FIG. 5.

In the measurement step, all of the average values of the measurement results of the output of the stacks 14 of the embodiment examples 2-1 to 2-3 and the comparative example 2 where the mixed gas is supplied to the cathode 28 were less than the reduction potential of the electrode catalyst (platinum) of 0.75 V.

As shown in FIGS. 2 to 5, it has been seen that it is possible to reduce the standard deviation in the embodiment examples 1-1 to 1-3 and 2-1 to 2-3 where the oxidation step was performed, in comparison with the comparative examples 1 and 2 where no oxidation step was performed. Therefore, since the measurement step is performed after variation in the oxidation reduction state of the electrode catalyst has been suppressed or eliminated by performing the oxidation step, even if the current applied between the anode 26 and the cathode 28 in the measurement step is smaller than the rated current, it is possible to suppress variation in the measurement results of the output. Accordingly, it is possible to obtain the measurement results of the output highly accurately, and it is not required to provide an apparatus in large scale or large quantities of the hydrogen gas, etc. for applying large current equivalent to the rated current. For this reason, with the simple structure, it is possible to perform output inspection of the stack 14 at low cost.

Figure 3:
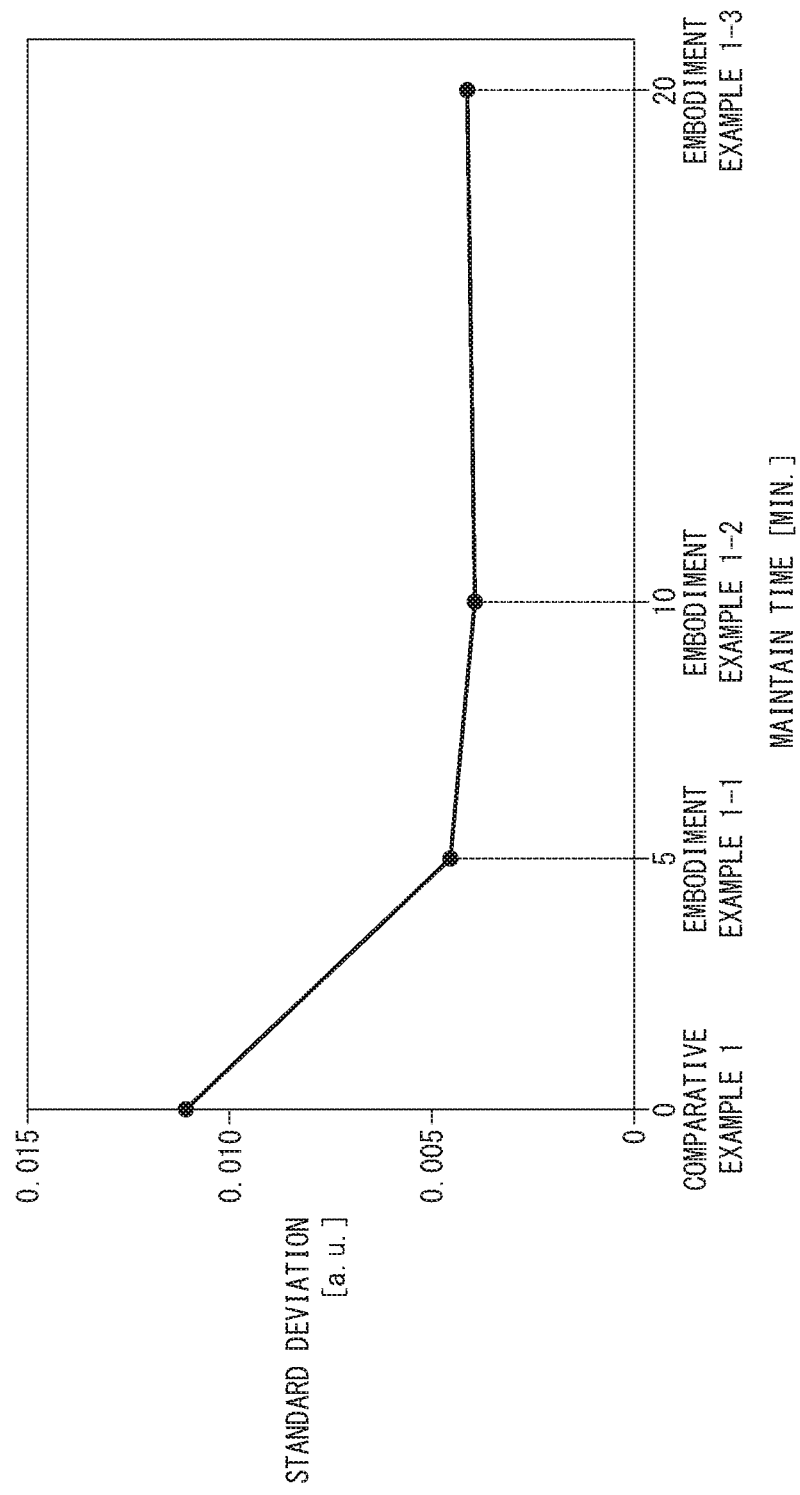
FIG. 3 is a graph showing the standard deviation in each of the embodiment examples 1-1 to 1-3 and the comparative example 1.

Further, the following points were found from FIGS. 2 and 3 in the embodiment examples 1-1 to 1-3. In the oxidation step, in the case where the maintain time is 5 minutes. (embodiment example 1-1), it is possible to sufficiently reduce the standard deviation in comparison with the comparative example 1. Further, it was found that, when the maintain time is 10 minutes or more (embodiment examples 1-2 and 1-3), it is possible to reduce the standard deviation more effectively. Therefore, in the case of obtaining the measurement results of the output in the measurement step which are not less than the reduction potential of the electrode catalyst, when the maintain time is 5 minutes or more, and more preferably, 10 minutes or more, it becomes possible to measure the output of the stack 14 with a higher degree of accuracy.

Figure 5:
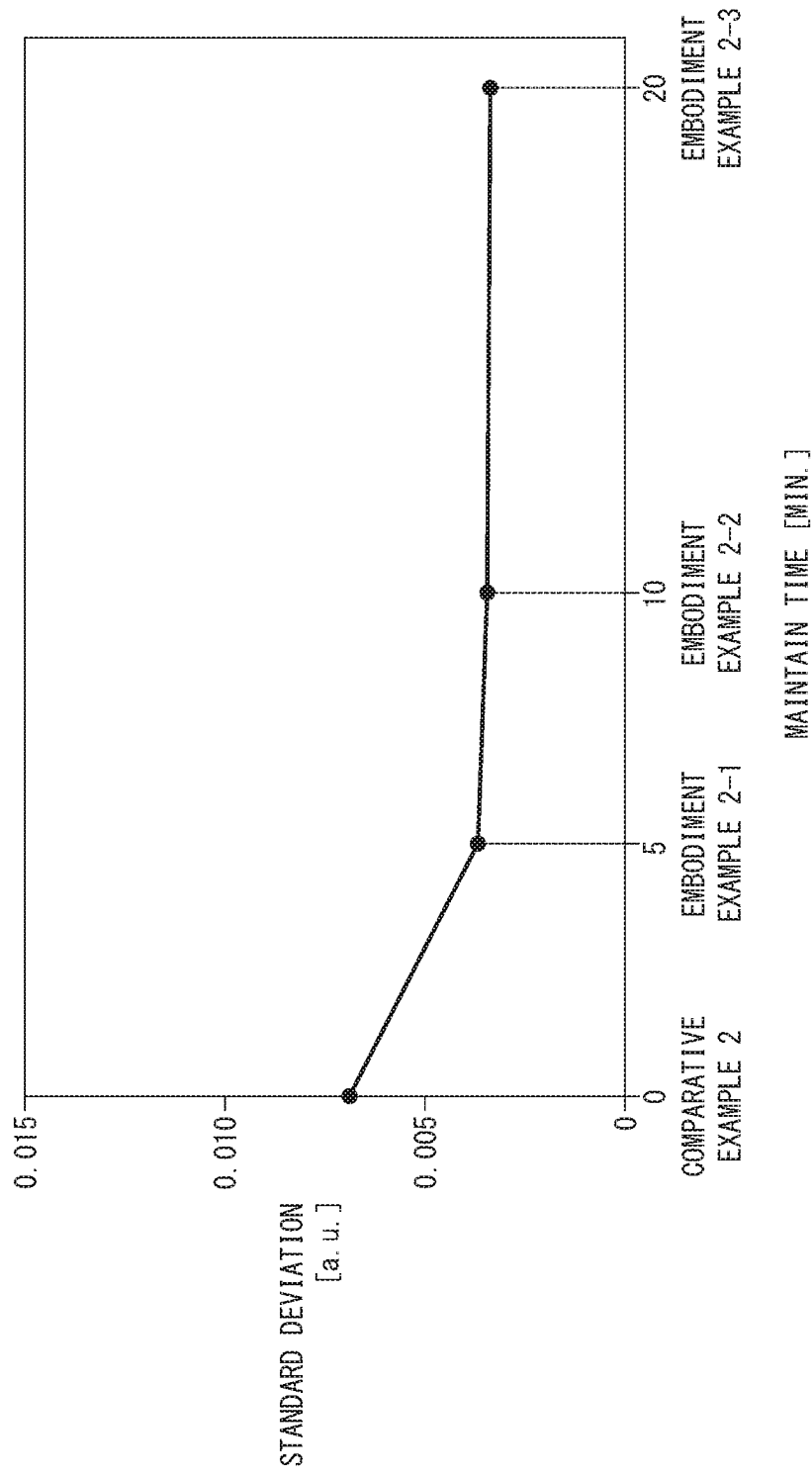
FIG. 5 is a graph showing the standard deviation in each of the embodiment examples 2-1 to 2-3 and the comparative example 2.

On the other hand, it was found from FIGS. 4 and 5 that, in the embodiment examples 2-1 to 2-3, in the oxidation step, in the case where the maintain time is 5 minutes (embodiment example 2-1), it is possible to reduce the standard deviation in comparison with the embodiment examples 1-1 to 1-3. In the case where the measurement results of the output are less than the reduction potential of the electrode catalyst, since it is possible to suppress oxidation of the electrode catalyst at the time of performing the measurement step, it is possible to further effectively suppress influence of the variation in the oxidation reduction state of the electrode catalyst on the measurement results of the output. As a result, for example, in comparison with the case where the measurement results of the output are not less than the reduction potential of the electrode catalyst, even in the case where the maintain time in the oxidation step is short, it becomes possible to measure the output of the stack 14 highly accurately.

Further, in the embodiment examples 2-1 to 2-3, since the mixed gas is supplied to the cathode 28, it is possible to reduce the quantity of the hydrogen gas consumed in the power generation reaction. Also in this respect, it becomes possible to reduce the cost required for output inspection of the stack 14.

Embodiment Example 3

Measurement results of the output of an embodiment example 3 were obtained in the same manner as in the case of the embodiment examples 1-1 except that the reduction step was performed before (1) the oxidation step. Specifically, in the reduction step, the temperature of the stack 14 set to the output inspection apparatus 10 before performing the oxidation step was regulated to 80° C. Further, by the first supply unit 40a, a hydrogen gas humidified to have a dew point of 75° C. was supplied to the anode 26 at a flow rate of 0.3 NL/min., and by the second supply unit 40b, a nitrogen gas (inert gas) humidified to have a dew point of 80° C. was supplied to the cathode 28 at a flow rate of 2.4 NL/min.

Then, after it was confirmed that the average cell potential of the cathode 28 became substantially constant at around 0.10 V, the cyclic voltage which is increased and decreased in the range between 0.08 V and 1.00 V was applied to the stack 14 by the voltage application unit 42 to apply reduction treatment to the electrode catalyst. At this time, the voltage was increased from 0.08 V to 1.00 V over a period of 45 seconds. Thereafter, the voltage was decreased from 1.00 V to 0.08 V over a period of 45 seconds. One cycle is made up of these periods. This cycle was repeated twice.

Thereafter, in the same manner as in the case of the embodiment example 1-1, (1) the oxidation step and (2) the measurement step were performed to obtain measurement results of output of the stack 14. For 10 measurement results of output of the stack 14 of the embodiment example 3 obtained by repeating the combination of the reduction step, the oxidation step, and the measurement step 10 times, in the same manner as described above, the ratio values relative to the average value, the standard deviation, and the average value of the ratio values were determined, and are shown in FIG. 6. For comparison, the ratio values relative to the average value, the standard deviation, and the average value of the ratio values in the embodiment example 1-1 are shown in FIG. 6 as well.

As shown in FIG. 6, it has been seen that the standard deviation can be further reduced in the embodiment example 3 where the reduction step was performed, in comparison with the embodiment example 1-1 where no reduction step was performed. Therefore, by performing the oxidation step after the reduction step, it is possible to perform the measurement step after the variation in the oxidation reduction state of the electrode catalyst has been suppressed or eliminated effectively. Consequently, it becomes possible to perform the output inspection of the stack 14 with a higher degree of accuracy.

What is claimed is:

1. A method of inspecting an output of a fuel cell, the fuel cell comprising an electrolyte membrane of solid polymer, an anode provided on one surface of the electrolyte membrane, and a cathode provided on the other surface of the electrolyte membrane, the method comprising:

an oxidation step of applying oxidation treatment to an electrode catalyst contained in the anode and the cathode;

and a measurement step of measuring the output of the fuel cell after the oxidation treatment is applied to the electrode catalyst, by applying a measurement current which is smaller than a rated current of the fuel cell to the anode and the cathode;

wherein in the oxidation step, a fuel qas is supplied to the anode and an oxygen-containing gas is supplied to the cathode to cause a voltage between the anode and the cathode to be not less than a reduction potential of the electrode catalyst.

2. The method of inspecting the output of the fuel cell according to claim 1, comprising a reduction step of applying reduction treatment to the electrode catalyst before the oxidation step.

3. The method of inspecting the output of the fuel cell according to claim 2, wherein in the reduction step, a fuel gas is supplied to the anode, an inert gas is supplied to the cathode, and a cyclic voltage is applied to the fuel cell, the cyclic voltage being increased and decreased within a predetermined range having a minimum voltage less than a reduction potential of the electrode catalyst.

* * * * *